United States Patent [19]

Lazzari et al.

[11] 3,846,841

[45] Nov. 5, 1974

[54] MULTIPLE MAGNETIC HEAD DEVICES

[75] Inventors: Jean-Pierre Lazzari, Villiers Saint Frederic; Jean Michard, Orsay, both of France

[73] Assignee: Compagnie Internationale Pour L-Informatique, Louveciennes, France

[22] Filed: June 25, 1973

[21] Appl. No.: 373,461

[30] Foreign Application Priority Data

July 3, 1972 France ............................ 72.23938

[52] U.S. Cl. ................ 360/121, 360/122, 360/123, 360/125

[51] Int. Cl. ....... G11b 5/12, G11b 5/26, G11b 5/20

[58] Field of Search ....... 179/100.2 C; 340/174.1 F, 340/74 MC; 360/121, 122, 123, 125

[56] References Cited

UNITED STATES PATENTS

| | | | |
|---|---|---|---|
| 3,344,237 | 9/1967 | Gregg | 179/100.2 C |
| 3,549,825 | 12/1970 | Trimble | 179/100.2 C |
| 3,564,558 | 2/1971 | Tolman et al. | 179/100.2 C |
| 3,611,417 | 10/1971 | Sauter et al. | 179/100.2 C |
| 3,639,699 | 2/1970 | Tiemann | 179/100.2 C |
| 3,700,827 | 10/1972 | Nagao | 179/100.2 C |
| 3,723,665 | 3/1973 | Lazzari et al. | 179/100.2 C |

*Primary Examiner*—Alfred H. Eddleman
*Attorney, Agent, or Firm*—Kemon, Palmer & Estabrook

[57] ABSTRACT

A plurality of planar magnetic heads have their air-gaps aligned along one edge of a common substrate and each coil terminal of the heads substantially reaches the rear edge of said substrate and is equipped with a flat conductor soldered thereto for the electrical connections of the heads to the external circuitry. The invention provides a two-stage protection of the device. The first, or primary, one, consists of a dielectric layer over the planar magnetic head structures, said layer reaching the level of the plane wherein are the exposed surfaces of the flat conductors and coats those parts of the substrate between the head structures. The second, or secondary one, consists of a dielectric plate secured to the top surface of the primary protective layer and the top surfaces of th flat conductors. Both the layer and the plate are of materials which substantially present the same thermal expansion coefficient as the material of the substrate. The secondary protective plate may serve as a substrate for a further group of heads provided with the same two-stage protection, and so forth, or it may be common to two groups of magnetic heads carried by two substrates and each having a primary protective layer, said layers being in facing relation with respect to each other and/or the common secondary protective plate. Magnetic and electrical shield films coat surfaces of the substrate and secondary protective plates.

14 Claims, 11 Drawing Figures

MULTIPLE MAGNETIC HEAD DEVICES

SUMMARY OF THE INVENTION

The present invention concerns improvements in or relating to the magnetic head blocks used for recording and reading information on memorizing magnetic layers. Its exploitation field embraces as well the industrial applications such as magnetic discs, drums and tapes for peripheral equipments as less specialized applications such as magnetophones and cassettes.

The overall performances of such devices and equipments largely depend upon the characteristics of the heads and their mounting blocks, panels and bars. The intrinsic characteristics of the magnetic head structures proper have been importantly improved with the planar magnetic heads made of a pile or stack of thin layers over a substrate, the magnetic, insulating and conductive layers together defining the combination of a pair of pole-pieces associated to a flat spiral or helix insulated coil. The invention more particularly relates to the assembly of such planar magnetic heads and the substrates thereof and has for its main object an improved protective arrangement for such assemblies, a protection which must be efficient and stable with the time both from the contamination, or corrosion, point of view and from the resistance to mechanical wears and degradations.

A further object of the invention is to so provide such an improved protective arrangement that it enters as an actual part in the structures of the multi-head assemblies, not only for easing the mechanical mounting of the assemblies but as well for increasing the precision of the relative positioning of the heads thereof and enlarging the possibilities of a high density of the heads in the assemblies, an important feature when the assemblies are used in large capacity peripherals and multi-tracks peripherals for instrumentality purposes.

Considering for instance the example of the head assemblies for magnetic disc equipments, the pitch of the tracks on the disc may be as low as 0.5 mm. On the other hand, in a conventional multi-head assembly, the pitch of the heads cannot be lower than 2mm, so that conventionally, the heads are distributed on four separate blocks, each block comprising nine heads for a 36 track magnetic disc.

Such a necessity leads to a substantial increase of the cost of the overall number of heads in the equipment and this cost problem is also met in the readers of tapes having a high number of recording tracks. Broadly speaking, the cost of a head must be considered as multiplied by a factor of three to four.

A protective arrangement according to the invention enables an easy assembly of heads wherein, in a single unitary unit or block, all the heads are spaced apart to the very pitch of the tracks of the magnetic record carrier, either a tape, a drum or a disc, entailing an estimated reduction by nearly 50 percent of the cost of the heads in the equipment.

Finally, it is well known that distinct geometries of the heads are better adapted for distinct functions thereof, such as, for instance, record, read and erase operations. Up to now, and in view of limitating the costs, a single "compromission" head was normally associated to a track in a large capacity magnetic recording eqiupment. However, such a capacity was restricted due to the necessity, inherent to the compromise, of having a suitably wide track for such a head. A protective arrangement according to the invention enables an easy assembly of heads of distinct geometries better adapted for the various functions in the equipment and consequently permits a better use of the magnetic surfaces of the record carriers, i.e., a reduction of the average width of a recording track.

According to a feature of the invention, a protective arrangement for a multi-head device wherein the air-gaps of the heads are aligned along one edge of a common substrate and the connecting terminals of the coils of the heads are aligned along an opposite edge of said substrate, each terminal having a flat conductor soldered thereto and extending parallelarly to the substrate, comprises the combination of a primary protection made of a dielectric layer coating the planar structures of the heads and the substrate intervals between the said structures, and a secondary protection consisting of a dielectric plate covering a same area as the substrate and secured to the top surface of the primary protective layer and of the top surfaces of the flat conductors.

DETAILED DESCRIPTION

Figure 1:
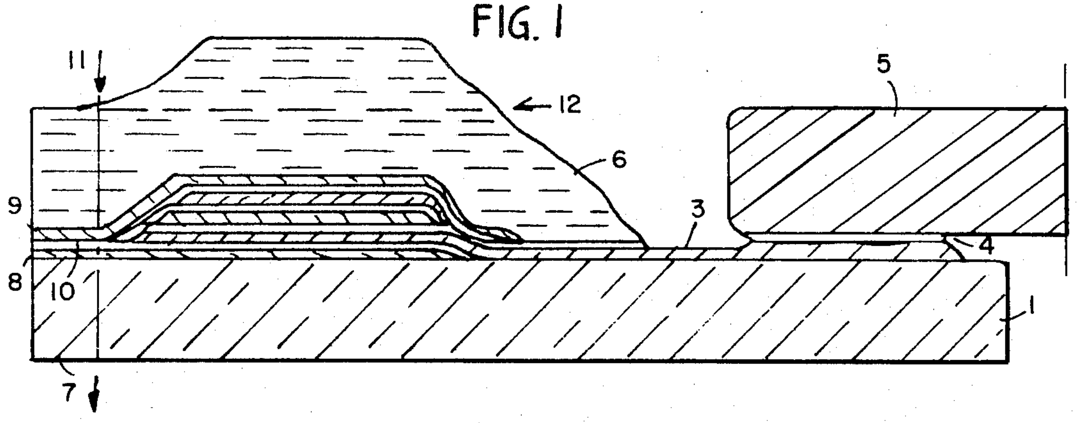
FIG. 1 shows a lateral cross-section view of a planar magnetic head provided with a primary protection according to the invention, FIGS. 2 and 3 respectively show lateral cross-section views of the head of FIG. 1 having both primary and secondary protections according to the invention.

In FIG. 1, a dielectric substrate, in a high melting point glass for instance, is carried a magnetic head structure 2 made of a stack of magnetic, insulating and conductive layers as for instance described in the copending application No. 373,460 filed June 25, 1973, in the name of Jean-Pierre LAZZARI entitled "Magnetic Transducer Structure." Said structure comprises a pair of magnetic layers 8 and 9 the airgap ends thereof are separated by an insulating layer 10, with an intervening flat coil insulated winding made of superposed and suitably shaped insulating and conductive layers. Part of the conductive layers extend rearwards, one of them being shown at 3 for constituting connecting layer conductors of the coil to external electrical circuitry. Each such conductor 3 ends in a terminal 4 to which is soldered a flat and thicker conductor 5 extending parallelarly to the plane of the substrate 1.

A more detailed description of the coil proper is unimportant for the present invention.

The magnetic head structures must be protected against chemical corrosion and mechanical wear. According to the invention, a primary protection is ensured by depositing over the heads a layer 6 of an insulating material presenting an important resistance to both these factors. Said material must further be such that its thermal expansion coefficient substantially corresponds to the thermal expansion coefficient of the material of the substrate and said latter material has been selected in view of the thermal expansion coefficients of the magnetic, insulating and conductive materials of which the head structures are made, as usual. The material of the layer 6 must also present a fair adherence to the material of the substrate it contacts between the head structures, and to the materials existing in the external surfaces of the head structures. It must further be such that the layer 6 can be obtained from a thermal evaporation process under a controlled atmosphere.

Illustratively, when the material of the substrate is corundum, the material of the primary protection layer may be alumina and, when the material of the substrate consists of a high temperature melting point glass, the material of the primary protection layer may consist of an intimate mixture of silicon monoxide and silicon dioxide in a ratio of $SiO/siO_2$ adjusted to a value of its thermal expansion coefficient compatible with that of the material of the substrate. For instance, such an intimate mixture may be obtained as follows:

The head coated structure is placed within a vacuum vessel containing a source of SiO activable by heat application for evaporation thereof. A low pressure water vapour, or pure oxygen, atmosphere is created within the vessel and the source is activated. As of common knowledge, evaporation of SiO in such conditions may lead to the formation of layers made of either SiO, or $SiO_2$, or any intimate mixture thereof, according to the rate of the controlled evaporation and the controlled content of oxygen within the vessel. SiO presents a thermal expansion coefficient of the order of $100.10^{-7}$ per degree C. $SiO_2$ presents a thermal expansion coeffiecient of the order of $2.5.\ 10^{-7}$ per degree C. Suitable glasses for the substrate may have thermal zxpansion coefficients varying from about $20.10^{-7}$ to $85.10^{-7}$ per degree Celsius. It is plainly conceivable to so control the conditions of evaporation of the SiO to obtain a layer 6 having a thermal expansion coefficient close to that of the glass used for the substrate.

The layer 6 also coats the spaces between the head structures on the substrate. It does not reach the rear coil terminals of the heads ending in thicker portions to which are soldered the connection flat conductors 5. For instance, for a head structure having about 10 turns in its coil, i.e., of a thickness of about 50 microns, the end portions of the coil terminals may be more than 10 microns thick.

The top surfaces of the conductors 5 define a plane with which the top surface of the layer 6 may preferably be co-plane, so that the secondary protection can, according to the invention, be applied as a dielectric non-magnetic plate 13 having a thermal expansion coefficient substantially identical to that of the substrate and also having a high elasticity modulus. Said plate may be of the same material as the substrate and, in any case, extends over a substantially identical area than the one of the substrate. In some cases, it may have the same thickness as the substrate.

Figure 4:
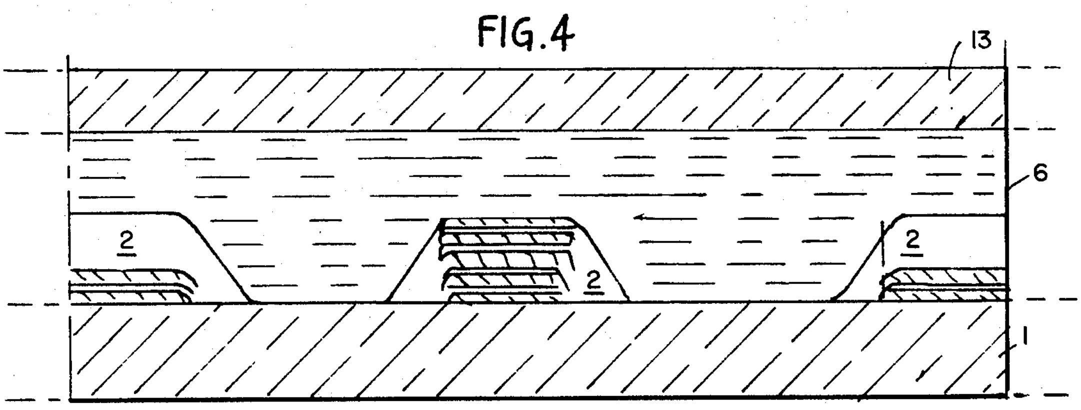
FIG. 4 shows a transverse cross-section view of a block of heads provided with the primary and secondary protections of the invention.

As shown in FIG. 1, the primary protection layer 6 is first brought to a thickness to which its top surface outpasses the plane of the top surfaces of the conductors 5 which are later brased or soldered to the terminals 4, after the thickness of the layer 6 has been suitably reduced from an abrasive process. This abrasion brought back the top of the layer 6 to the level 12. The purpose of this provision is that, as clearly shown in FIG. 4, for obtaining a layer 6 which completely fills up the spaces between the heads on the substrate. Such an arrangement however is not imperative and the layer 6 might be obtained at the level 12 after which its top surface is polished prior to the bonding of the secondary protection plate 13. Dales would exist between the head structures, which might be later filled with a filler material such as a resin.

Figure 2:
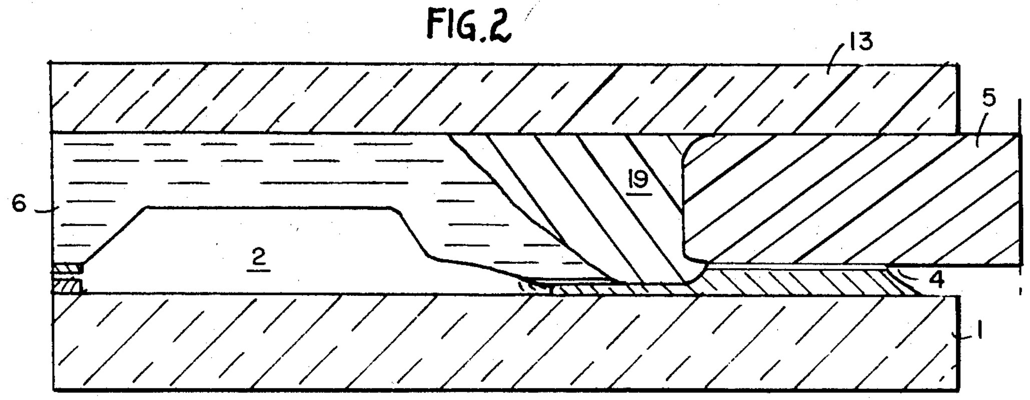

This would be automatically obtained when, FIG. 2, the bonding of the secondary protection plate 13 is ensured by a high stability resin such as an epoxy, (19), which at least partially fills the spaces between the layer 6 and the substrate, and also fills the spaces between the flat conductors 5. An increase of the bonding efficiency is obtained by providing the inner face of the plate 13 of a non null nominal ruggedness, obtained when needed by any appropriate treatment of said face, including the formation of narrow ducts in the surface.

Figure 3:
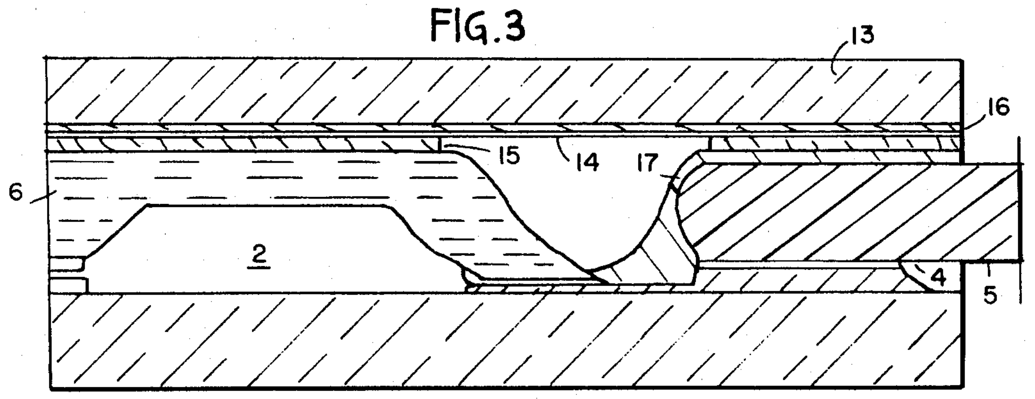

In another bonding method, FIG. 3, an insulating film 17 is first evaporated on the surfaces of the conductors 5 and over the terminal leads of the coils of the head structures. On top of the layer 6 and of the film 17 is formed a film of copper 15. Another film of copper is provided on the inner face of the plate 13 and the two copper films are bonded by a solder layer 14. This solder may be a tin-lead one which presents a melting point at about 200° C., so that the head structures remain unaffected by the soldering operation.

As said, the thickness of the dielectric plate 13 may be of the same order of magnitude as that of the substrate 1, i.e., of the order of the millimetre, so that it contributes to the mechanical resistance of the complete device and, of course, its bond to the layer 6 and the conductor surfaces must be such that no substantial internal stress develops within the plate, which is the case in the above described embodiments.

As shown in the left-hand part of FIG. 1, the device may present an extension which may be later removed by cutting or abrading it up to the level indicated at 11. This is mainly provided for devices comprising a stack of such elementary bars as the one of FIGS. 1 to 4 and as shown in the following figures of the drawings.

In such stacks, further, it may be of advantage to provide magnetic and electrical shielding for the heads. This may be obtained by depositing over the surfaces of the substrate and secondary protection plates, thin films of alternate copper and ironnickel material such as "Permalloy":

For instance, FIG. 3, the layer 16, instead of being restricted to a copper film may be made of alternate iron-nickel and copper thin films and, prior the deposition of the head structures over the substrate, the face of the substrate may have been coated with such alternate films (and of course, a top insulating film for relative isolation of the head structures).

Figure 5:
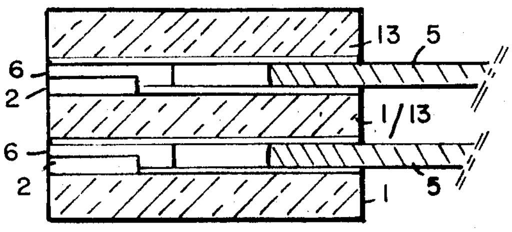
FIG. 5 shows a cross-section view of an arrangement comprising two superposed protected magnetic heads.
Figure 6:
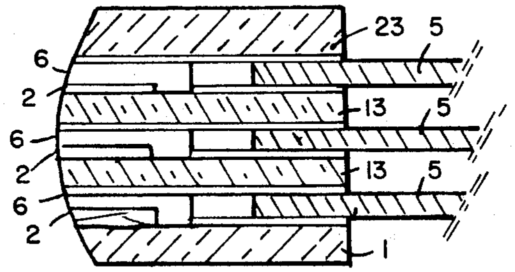
FIG. 6 shows a cross-section view of an arrangement comprising three superposed protected magnetic heads.

FIGS. 5 to 11 respectively show various arrangements of devices comprising more than one elementary assembly as disclosed in FIGS. 1 to 4. In FIG. 5, the stack comprises two such assemblies, the secondary protection plate 13 of the lower one constituting the substrate of the upper one. Substrate 1, intermediate substrate 1/13 and protection plate 13 are provided of the same thickness. In FIG. 6, a "three-deck" device is shown, wherein the intermediate plates 13 are thinner than the substrate 1 and the top protection plate 23. Illustratively, when the thickness of 1 and 23 is of the order of one millimeter, the thickness of an intermediate plate 13 may be restricted to about one-tenth of a millimeter, not to unduly thicken the complete structure.

No special difficulty is met for ensuring a relative positioning of the magnetic heads during the formation of the stack, as all the more the airgaps of the heads are exposed and may ease the positioning operation proper. Consequently such an arrangement as the one shown in FIG. 7 may be easily provided wherein the airgaps of the rows 2, 22 and 32 of the heads may be relatively shifted by their own widths from one row to the next one. Such an arrangement enables the use of a single magnetic head device for cooperation with a plurality of closely spaced magnetic tracks (P) of a magnetic information carrier member such as a tape, a disc or a drum, i.e. a high density information member.

Figure 8:
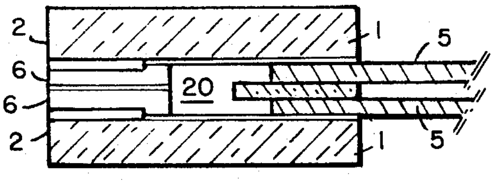
FIGS. 8 and 9 respectively show cross-section views of two assemblies of protected magnetic heads, and, FIGS. 10 and 11 show exemplary cross-section views of multi-head assemblies embodying diversified function magnetic heads.
Figure 9:
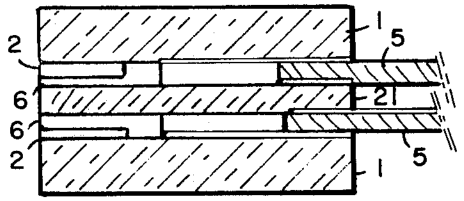

FIGS. 8 and 9 show two respective arrangements wherein the elementary head assemblies are provided in relatively reversed relation. The two substrates 1 constitute the two outer member of the arrangement. In FIG. 8, the secondary protection plate 20, common to both rows of heads, only extends over the faces of the conductors 5 and the two primary protection layers 6 are directly bonded. In FIG. 9, on the other hand, the secondary protection plate 21 extends between the complete elementary structures.

Figure 10:
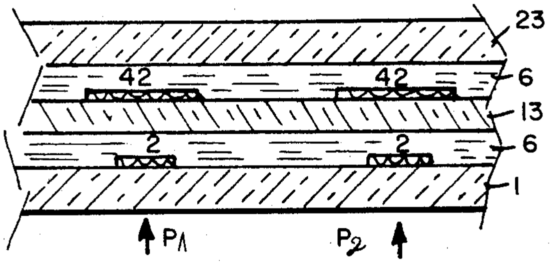

In FIG. 10, the two rows of heads 2 and 42 are made of different widths from one row to the other one, though having their axes coincident in a direction perpendicular to the stack. It is known that the geometries of the heads must preferably be specialized according to the functions to which they are devoted in the equipments. For instnace, heads 2 will serve as reading heads whereas heads 42 will be used for recording. A further row may be provided when required having heads specialized for erasement prior to recording.

Figure 7:
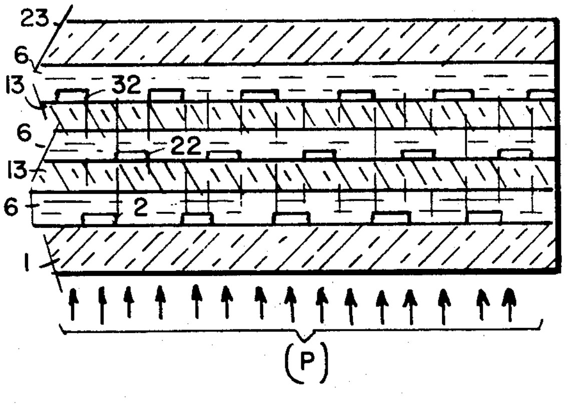
FIG. 7 shows a cross-section of 90° of the view of FIG. 6.
Figure 11:
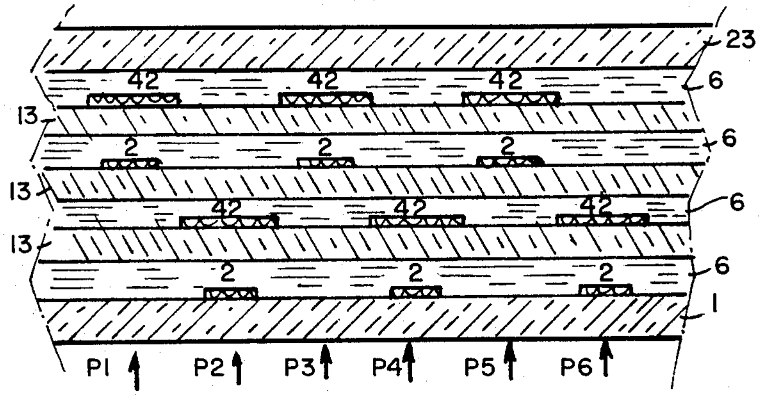

FIG. 11 shows a stack combining the features of the stacks of FIGS. 7 and 10, intended to cooperate with magnetic tracks, such as P1 to P6 of a magnetic record.

As already mentioned, it is in such stacks that the provision of electrical and magnetic shielding films will be of importance.

When necessary, further, a purely mechanical carrier plate, thicker than the substrate, may be add to the stacks in an obvious way.

What is claimed is:

1. A read-write magnetic head device comprising in combination:

a. a dielectric, non-magnetic planar substrate;
b. a plurality of planar magnetic head structures having their air gaps aligned on one edge of said substrate, each head including a flat coil;
c. a plurality of coil terminals substantially aligned on an opposite edge of said substrate;
d. a plurality of flat conductors equal in number to said terminals, one soldered to each of said terminals respectively, said conductors having a uniform thickness so that their upper surfaces lie in a common plane parallel to the plane of said substrate;
e. a primary protection formed of a dielectric layer coated over said magnetic head structures, having one surface which is flat and substantially level with but spaced from the upper surfaces of said flat conductors and a second surface joining said first and sloping toward but terminating short of said terminals;
f. a secondary protection formed of a non-magnetic dielectric plate having substantially the same area as said substrate and applied over the upper surfaces of said primary protection and flat conductors; and
g. bonding means between said plate and said primary protection and flat conductors; the materials of said primary and secondary protections having coefficient of thermal expansion substantially equal to that of said substrate.

2. Combination according to claim 1, wherein said bonding means comprises a mass of resin material bonding the lower surface of the secondary protection plate not applied to the surfaces of said primary protection layer and of said flat conductors to the said sloped surface of the primary protection and the surface of the substrate between the said primary protection layer and said flat conductors.

3. Combination according to claim 1, wherein the said bonding means comprises the combination of:

an insulating film over the upper surfaces of the flat conductors,
conductive films coating the upper surface of the primary protection layer and said insulating film,
a layer of solder interposed between the said conductive films and the lower surface of the secondary protection plate applied thereover.

4. Combination according to claim 3, wherein the material of said conductive films constitutes a magnetic and electrical shielding element in the device.

5. Combination according to claim 1, wherein two groups of heads separately formed on two distinct substrates and each provided with a primary protective layer are assembled with a common secondary plate between the primary protective layers thereof.

6. Combination according to claim 5, wherein the secondary protective common plate is limited to the flat conductor surface plane and the respective primary protective layers are contacting each other in the assembly.

7. Combination according to claim 1, wherein the material of said secondary protection plate is the same as the material of the substrate.

8. Combination according to claim 7, wherein said substrate is a high temperature melting point glass, the material of said primary protection layer consists of an intimate mixture of silicon monoxide and silicon dioxide in a ratio adjusted to impart to the mixture a thermal expansion coefficient substantially equal to that of the glass.

9. Combination according to claim 7, wherein said substrate is corundum and the material of the primary protection layer is alumina.

10. Combination according to claim 1 in which there are at least two spaced layers of magnetic heads, said secondary protection plate serving as the substrate for the second layer.

11. Combination according to claim 10, wherein the substrate and the last secondary protective plate are of identical thickness.

12. Combination according to claim 10, wherein the substrate and secondary protective plates have surfaces coated with magnetic and electric shield films.

13. Combination according to claim 10, wherein the magnetic heads in each layer have their airgaps relatively shifted by the widths of said airgap from one to the other one of the layers.

14. Combination according to claim 10, wherein the geometries of the heads, from group to group of heads, differ according to distinct functions of said heads.

* * * * *